US007593881B2

(12) United States Patent
Winklevoss et al.

(10) Patent No.: US 7,593,881 B2
(45) Date of Patent: Sep. 22, 2009

(54) SYSTEM AND METHOD FOR DONOR-DIRECTED ASSET MANAGEMENT

(75) Inventors: Howard E. Winklevoss, Greenwich, CT (US); Rodney J. Vessels, West Redding, CT (US); Mark J. Rakov, Upper Montclair, NJ (US)

(73) Assignee: Winklevoss, LLC, Greenwich, CT (US)

( * ) Notice: Subject to any disclaimer, the term of this patent is extended or adjusted under 35 U.S.C. 154(b) by 882 days.

(21) Appl. No.: 10/445,838

(22) Filed: May 28, 2003

(65) Prior Publication Data

US 2004/0162775 A1 Aug. 19, 2004

Related U.S. Application Data

(60) Provisional application No. 60/447,315, filed on Feb. 14, 2003.

(51) Int. Cl.
G06Q 40/00 (2006.01)
(52) U.S. Cl. .................... 705/36 R; 705/35
(58) Field of Classification Search .......... 705/35, 705/36 R
See application file for complete search history.

(56) References Cited

U.S. PATENT DOCUMENTS

| 5,775,734 | A | 7/1998 | George, Jr. | |
|---|---|---|---|---|
| 6,338,047 | B1 | 1/2002 | Wallman | |
| 2001/0037275 | A1* | 11/2001 | Johnson et al. | 705/36 |
| 2002/0069149 | A1 | 6/2002 | Maxwell et al. | |
| 2003/0163402 | A1* | 8/2003 | Kincart | 705/36 |

OTHER PUBLICATIONS

Delaney, Dennis R., "Client Strategies—Venture Philanthropists: When it comes to charitable contributions, many newly wealthy give more yet expect more from organizations they benefit," *Financial Planning*, Jun. 1, 2000 (3 pages).
Edie, John A., "Meeting the Requirements for an Advised Fund in a Foundation," *Trusts & Estates*, vol. 131, No. 11, pp. 45-48 (Nov. 1992) (6 pages).
Fenn, Donna, "Shaking the Foundations. (*philanthropy of businesspeople*)," pNA May 1, 2002 (p. 1-6).
"The Schwab Fund for Charitable Giving™ Releases Two Powerful New Web-Based Tools for Charity," *PR Newswire*, Oct. 3, 2000 (2 pages).

(Continued)

*Primary Examiner*—Lalita M Hamilton
(74) *Attorney, Agent, or Firm*—Finnegan, Henderson, Farabow, Garrett & Dunner, L.L.P.

(57) ABSTRACT

Methods and systems for facilitating donor-directed asset management are provided. In one embodiment, a program agreement may be established between a donor and a donee and an asset may be donated from the donor to the donee. The program agreement may specify, among other things, a period of time for investing the asset. The donor may invest the asset after donating it to the donee according to the terms of the program agreement. The investment of the asset may be monitored by an administrator to help ensure compliance with the program agreement. When the period for investing expires, the donor may relinquish investment control, and the asset and any proceeds realized by its investment may be transferred to the donee.

47 Claims, 11 Drawing Sheets

OTHER PUBLICATIONS

"The Schwab Fund for Charitable Giving ™ Tops $100 Million in Donations," *PR Newswire*, Dec. 7, 2000 (2 pages).

Stevens, Michael G., "Donor-Advised Funds," *Practial Accountant*, vol. 33, No. 5, pp. 57, May 2000, (5 pages).

"Thornburg plans donor-advised fund," (Thornburg Investment Management planning donor-advised fund), *Fund Marketing Alert*, vol. 6, No. 45, PP 5(1), Nov. 12, 2001 (1 page).

Whitford, David. "The New Shape of Philanthropy: The Internet generation is bringing the principles of venture capital to philanthropy. It's innovative—but is it effective?," *Fortune*, Jun. 12, 2000 (2 pages).

Internal Revenue Service Private Letter Ruling PLR-163849-03, dated Jul. 12, 2004, 6 pages.

Internal Revenue Service Private Letter Ruling PLR-163848-03, dated Jul. 12, 2004, 6 pages.

Taxwise Giving, "Donor managed Investment Account— Exciting New Kid on the Block," Conrad Teitell, vol. XLII, No. 11, Jul. 2004, pp. 1-5.

"The DMI Account Program," Winklevoss Consultants, http://winklevoss.com/winklevoss/dmi_home.html, printed on Aug. 4, 2004.

* cited by examiner

Example Portfolio

Gifts

| Date | Amount |
|---|---|
| 12/15/01 | $100,000 |
| 12/12/02 | 100,000 |
| Total | $200,000 |

Portfolio #1

| Security | 4/16/03 Mkt. Value | 1/1/03 Mkt. Value | Percent Change |
|---|---|---|---|
| IBM | $25,000 | $22,000 | 12 |
| ABC | 35,000 | 33,000 | 6 |
| XYZ | 125,000 | 120,000 | 4 |
| Total | $185,000 | $175,000 | 6 |

Pledges

| Date | Amount |
|---|---|
| 12/31/03 | $100,000 |
| 12/31/04 | 100,000 |
| 11/31/05 | 100,000 |
| Total | $300,000 |

Portfolio #2

| Securities | 4/16/03 Mkt. Value | 1/1/03 Mkt. Value | Percent Change |
|---|---|---|---|
| BCD | $10,000 | $9,000 | 10 |
| EFG | 30,000 | 30,000 | 0 |
| HIJ | 40,000 | 35,000 | 13 |
| Total | $80,000 | $74,000 | 8 |

Total Gifts & Pledges

| | |
|---|---|
| Gifts | $200,000 |
| Pledges | 300,000 |
| Total | $500,000 |

Total Portfolio

| | 4/16/03 Mkt. Value | 1/1/03 Mkt. Value | Percent Change |
|---|---|---|---|
| Portfolio #1 | $185,000 | $175,000 | 6 |
| Portfolio #2 | 80,000 | 74,000 | 8 |
| Total | $265,000 | $249,000 | 6 |

Fig. 6

Example Summary Report — 700

Donor #1

| Gifts | $200,000 | | 4/16/03 | 1/1/03 | Percent |
|---|---|---|---|---|---|
| Pledges | 300,000 | | Mkt. Value | Mkt. Value | Change |
| Total | $500,000 | | | | |
| | | Portfolio #1 | $185,000 | $175,000 | 6 |
| | | Portfolio #2 | 80,000 | 74,000 | 8 |
| | | Total | $265,000 | $249,000 | 6 |

Donor #2

| Gifts | $100,000 | 4/16/03 | 1/1/03 | Percent |
|---|---|---|---|---|
| Pledges | 200,000 | Mkt. Value | Mkt. Value | Change |
| Total | $300,000 | $90,000 | $100,000 | -10 |

All Donors

| Gifts | $300,000 | 4/16/03 | 1/1/03 | Percent |
|---|---|---|---|---|
| Pledges | 500,000 | Mkt. Value | Mkt. Value | Change |
| Total | $800,000 | $355,000 | $349,000 | 2 |

Fig. 7

SYSTEM AND METHOD FOR DONOR-DIRECTED ASSET MANAGEMENT

CROSS REFERENCE TO RELATED APPLICATION

This application claims the benefit of U.S. Provisional Patent Application No. 60/447,315, filed Feb. 14, 2003, the disclosure of which is expressly incorporated herein by reference in its entirety.

TECHNICAL FIELD

This invention generally relates to business practices for managing donations, and more specifically to methods and systems that allow organizations to improve the timing, amount and source of donor contributions by capitalizing on donor motivation.

BACKGROUND

An organization's financial sustainability often depends largely upon funding from private and public donors. Non-profit organizations ("NPOs"), for example, are especially reliant on donor contributions to maintain solvency. In fact, donors directly contribute hundreds of millions of dollars annually to NPOs. It is projected that NPOs will receive trillions of new donations over the next several decades.

Conventional charitable giving vehicles typically used by donors contributing to nonprofits include Foundations, Supporting Organizations, Donor-Advised Funds, Community Trusts, Pooled-Income Funds, Charitable-Gift Annuities, Charitable-Remainder Trusts, Charitable-Lead Trusts, and Proceeds of Life Insurance.

Foundations: Foundations are private philanthropic endowments that allow their participants to manage and oversee charitable activities. Donors receive income tax deductions as well as estate and gift tax deductions. Foundation types include community foundations, corporate foundations, family foundations, private independent foundations, and public foundations. Foundations can be established as either trusts or corporations.

Foundations offer their contributors the ability to accumulate tax-free investment income from the donated principal, and the freedom to select investment vehicles of their choosing. In addition, grants can be made to charitable organizations at the foundation board's discretion at any time and in any amount.

Foundations, however, carry considerable administrative burdens to establish and operate, including the preparation of state and federal tax returns, reports for filing with the state within which it operates, hosting annual foundation board meetings, and preparing the necessary minutes of meetings and board reports, providing notice, reports and other communication as required for board members, affiliated organizations, or related charities. Foundations usually hire staff to meet these reporting requirements, which adds considerable cost to the management of the entity. Initial contributions to establish a Foundation can be quite high, typically $500,000 or more. Foundations have a limit on the initial tax deduction that donors can take for contributed assets, restricted to 30% of Annual Gross Income (AGI) for cash contributions and 20% of AGI for gifts of securities. Foundations also require the payment of an annual excise tax, typically levied in an amount representing 2% of annual net investment income. Furthermore, Foundations are required to distribute a minimum of 5% of their net assets annually.

Supporting Organization (SO): An SO qualifies as a public charity rather than a private Foundation, and as such is eligible for better tax treatment of deductions than are recognized for Foundations. By definition of the Internal Revenue Service ("IRS"), SOs must operate exclusively for the benefit of, or carryout the purpose of, one or more 501 (c) (3) organizations. A Board of Directors appointed by the donor oversees the investment and use of contributed assets.

There are three types of SOs, and each must meet specific requirements prescribed by the IRS. One type requires the manager of the supported organization to sit on the SO's board. Another type requires the supported organization's board to appoint the managers of the SO to their board. The third type does not require commonality of management, but does require the SO to be "highly responsive" to the needs of the supported organization. This is currently the most popular type, in which donor and family appoint the board. The board must be independent, which excludes the substantial donor, their family members or employees, from exercising direct or indirect control (defined as board majority). However friends or advisors can be appointed to board positions.

This third type of SO must also meet a number of stringent tests in order to qualify as a public charity. For example, the SO has to distribute at least 85% of its income to one or more of the supported organizations annually. It must past an "attentiveness test." The SO's grants must be substantial portion of the recipient's total revenue for the year in order to be considered "attentive." It must also pass a "relationship test," and be "operated in connection with" the charity. This requires the SO to be "responsive to the needs" of the charity and to maintain significant involvement with the supported organization because the supported organization depends on the SO for the type of support it provides."

SOs can be an attractive alternative to private foundations in that they offer HFNDERSON greater tax deductibility (50% of AGI rather than 30%). They are often used as a means for the donor to hire family members at the SO to manage daily activities. They have no prohibition against self-dealing, no excise taxes, and no 5% minimum payout rules. The primary drawbacks of an SO include donor control and administration. Primary donors are disqualified from directly controlling the board, which is responsible for managing the investment of contributed assets. Although they can exercise some degree of influence by appointing trusted advisors to board positions, their influence over investment management is severely diluted. This is much less donor control than with an account under the present invention, which offers the donor sole discretion in determining and implementing investment strategy for funds that have been gifted. Additionally, there is significant administrative burden (and associated cost) with an SO. As a separate legal entity, an SO requires preparation and filing of legal documents to become established. Annual filings are also required with the IRS and some state authorities, though requirements are less onerous than with private foundations.

Donor-Advised Funds: Donor-advised funds are charitable-giving vehicles that pool donations from multiple donors, and are managed by professional advisors. Donors create their own separate accounts from which grants are made at the donors' discretion. Investments grow tax-free because gains remain in the fund and are added to the principal. Donors, however, realize a tax deduction in the year they donate the funds. Gifts to the fund immediately become the property of that particular fund. Donor-advised funds often include certain asset classes, but are generally limited to mutual funds rather than individual securities or alternative investments.

Donors generally can choose from a limited number of investment alternatives for managing their assets. When making a contribution, donors "advise" the fund how to distribute the monies, although each donor-advised fund limits the donors' choices of investment alternatives, as well as their right to reallocate assets at their discretion. Because donor-advised funds, to be exempt from the tax limitations applicable to private funds, are subject to the tax regulatory scrutiny comparable to public "community trusts," they cannot be bound by the donors' wishes as to the ultimate charity to receive the donors' contributions, although funds typically follow the donors' wishes.

In addition, these funds must be able to use and control the contributed assets freely and effectively. These rules ensure that the donor-advised fund serves, for example, as a "component fund" for public charities, rather than merely a private foundation subject to more stringent tax requirements.

As stated above, Donor-advised funds typically offer only a very limited selection of investment alternatives for the donor, with available choices often limited to four choices or less, and rarely exceeding ten different options. The donor is also quite restricted in their ability to reallocate assets among investment alternatives, and is usually limited to just a few reallocations annually. Operating costs for donor-advised funds can also be comparatively high, as the industry average for operating costs of donor-advised funds is currently in the 1.5% per annum range.

Community Trusts: A donor may create a "designated fund" with a community trust organization that will make grants to a specified charitable organization or several organizations to fulfill a client's donative intent. Alternatively, a donor may create an "advised fund with a community trust organization, which is unrestricted; however, the client and/or the client's family may suggest how grants should be made. Although in theory the community trust organization is not obligated to follow such instructions, in practice they almost are always followed.

Advantages of community trust organizations include the absence of excise tax, relatively few administrative responsibilities, and minimum start-up costs. Disadvantages include lack of control, in that neither the donor nor his/her family will have direct control over the fund's grantmaking. Grants will have a less direct connection with a donor and his/her family than if they are made from the family or from an organization that bears the family name.

Pooled-Income Funds: Pooled-income funds are trusts that combine a donor's gift with other donors' gifts to benefit both the nonprofit and the individuals concerned. Generally, a nonprofit, or in some cases, a for-profit organization, establishes a pooled-income fund as a vehicle for donors who are interested in receiving income from monies they contribute. A donor (or designate) receives a proportionate share of the income earned from the fund each quarter, which varies based upon performance of the fund's investments. A tax deduction based on the actuarial value of the nonprofit's interest in the gift to the fund is realized when funds are donated. Upon the death of the surviving beneficiary, a proportionate share of the pooled income fund's principal is removed from the fund and distributed to the nonprofit for the purpose designated by the donor. Pooled-income funds often offer limited investment alternatives with differing risk parameters, typically including: (1) balanced funds offering investments that emphasize a mix of current income and long term growth, (2) growth funds emphasizing growth investments rather than income, and (3) current funds with investment objectives seeking a sustained high rate of income over the long term.

Investments grow tax-free, and each donor receives a share of the earned income. The nonprofit owns the funds during the investment period, but donors to pooled-income funds have limited investment choices available, and their ability to reallocate their investments is limited. The primary attraction of pooled-income funds is the income stream that they provide back to the donor. As such, they are less attractive to donors whose primary objective is to maximize the value of their contribution to the nonprofit organization. The income provided for the donor (or his designates) has a dilutive effect on the overall contribution, which runs counter to the primary motivation of certain types of donors. This fact, coupled with the inability of the donor to influence the management of gifted assets in any respect, limits the appeal of pooled-income funds for proactive donors seeking to make a significant impact on the nonprofit organization they are supporting.

Charitable-Gift Annuities: Charitable-gift annuities are agreements between a donor and a nonprofit in which a contribution is made in return for the nonprofit's promise to pay recipients a prearranged fixed income (i.e., a tax-free annuity) for life. Income payments can begin immediately or be deferred. The nonprofit either funds the annuity itself or, more commonly, uses the lump-sum donation to purchase an annuity from an insurance company. The difference between the cost of purchasing the annuity and the original donation is available for the nonprofit's needs.

The assets of the nonprofit organization typically guarantee annuity payments. The donor receives a tax deduction in the amount that the gift exceeds the total expected annuity payments. Once established, gift annuities are irrevocable. After the donation is made, the donor receives income from his contribution in the form of an annuity.

Charitable-Remainder Trusts: Charitable-remainder trusts are separately managed trusts established by a donor that provide income to the donor or another person for a specified term. Upon the death of the last surviving income beneficiary, the assets in the trust pass to the nonprofit to be used for the purpose designated by the donor. The tax deduction equals the value of the nonprofit's right to receive the trust's assets in the future, but the nonprofit does not guarantee these payments. Donors can contribute a variety of assets, including cash, stocks, bonds, and real estate.

Under a charitable-remainder trust, the donor may receive an income stream generated by the assets put into trust, but the donor must obtain a professional evaluation of the trust assets to determine its residual value for tax purposes. Typically, a minimum gift size may apply.

Charitable-Lead Trusts: Charitable-lead trusts are separately managed trusts that provide a fixed or variable income stream to the nonprofit during a specified number of years. At the end of the trust term, the assets pass back to the donor's heirs. This allows the donor to make a future transfer of assets to his heirs at substantially reduced gift and estate tax costs, while providing an income stream to the nonprofit for a term of years. If assets are left to beneficiaries other than original donors, this vehicle is called a "non-grantor-lead trust." A trust in which the principal reverts back to the donor is called a "grantor-lead trust." Distributions to the nonprofit can take two forms: (1) a unit trust values the trust assets annually and pays the nonprofit a fixed percentage of that amount; or (2) an annuity trust pays a fixed annual amount based on initial funding, regardless of the trust's fluctuating value. The nonprofit receives an income stream from assets put into trust, and the principal reverts to the donor (or a designate) at the conclusion of the charitable-lead trust. The nonprofit, however, does not receive the full value of the principal donation.

With Charitable-Gift Annuities, Charitable-Remainder Trusts and Charitable-Lead Trusts, the donor is looking for an annuity stream rather than management of the assets, and generally the donor has no or limited ability to manage the investments of such assets.

Proceeds of Life Insurance: Donors may arrange with a nonprofit for the purchase or transfer of a life insurance policy based on the donor's life. The nonprofit is named the owner and beneficiary of the policy. The donor makes regular payments to the nonprofit, which in turn makes the premium payments to keep the policy in force. Upon the donor's death, proceeds of the life insurance policy pass directly to the nonprofit. The donor receives tax deductions for the contributions made during their lifetime. If the donor stops paying for the premiums, the nonprofit can decide to continue paying the premiums. This vehicle allows a donor to create a gift, with principal generally growing on a fixed interest basis, to a nonprofit organization through tax-deductible insurance premiums.

Many donors have diminishing confidence in the abilities of NPOs and outside financial planners to effectively invest their gifted assets. The conventional donation arrangements described above, short of creating expensive and tax-restrictive private foundations, fail materially to provide donors with the ability materially to manage investments once a donation is made or to pursue post-donation investment alternatives without formidable administrative challenges. This ability to manage, build, and shape contributions, however, is often highly valued by donors and, in some cases, may serve as the principal motivation for making donations. Often, a donor desires to be a producer and influencer, rather than just a supporter or participant in their philanthropic activity. Such a donor typically wants to influence the investment allocations, not just expend accumulated wealth. Conventional donation arrangements do not enable participating donors materially to manage and allocate contributed funds in accordance with preferred investment strategies. Nonprofits have been slow to apply seminal research on donor motivations and characteristics, and the lethargy is likely to continue.

Methods, systems, and articles of manufacture consistent with certain embodiments of the present invention are directed to one or more of the issues set forth above.

SUMMARY

The present invention is directed to methods and systems that may obviate one or more of the above and/or other problems by enabling donees (e.g., NPOs) to capitalize on donor motivation to attract, improve relations with, and increase donations received from donors. Systems and methods consistent with the invention may motivate donors to contribute sooner and in larger amounts. One embodiment, consistent with the present invention, may allow an organization to attract and motivate wealthy donors by offering those donors substantial tax benefits and the ability to retain direct control over asset investment for an agreed-upon period of time after contributing the asset.

Systems and methods consistent with the present invention may enable a donor and donee (e.g., an NPO) to establish a program agreement. The program agreement may, for example, specify the amount, timing and type of donation, including an initial contribution and future pledges, the purpose of the donation(s), the length of time the donor can retain control over the investment, the available investment options and/or investment guidelines, and the ultimate use of proceeds from the donation. Consistent with principles of the present invention, the donor may transfer a donation to the donee and then direct investment of the asset after the donation is received by the donee. The investment and activities of the donor and/or donee may be monitored by an administrator to help ensure compliance with the program agreement. In addition, a system and method may facilitate negotiation of the program agreement between the parities, including a "match-making" apparatus for helping the donor propose investment guidelines and the donee making final investment guideline decisions. Also, the systems and method may include the offering of risk analytics, which may include investment performance, and various risk measurements.

Participating donors gain an ongoing ability to manage and allocate their contributed funds in accordance with predetermined investment guidelines after the donation is made, the ability to select the purpose of the capital gift, the opportunity to grow their investments in a tax-free environment, and retention of full tax deductibility of initial contribution amount in the year in which the donation is made with no taxes on resulting final contribution benefit. Such an arrangement can be priced attractively with the donee or donor, as the case may be, paying no or low upfront set-up or continuing administration fees.

Systems and methods consistent with the present invention may permit the donor to select from several investment alternatives (e.g., stocks, bonds, indices, mutual funds, commercial paper, CDs, IRAs, real estate, etc.) to grow their contributions. Invested funds will have the opportunity to grow tax-free for the agreed-upon term, and at the conclusion may be employed for the purposes the nonprofit and donor set forth in the program agreement.

Consistent with principles of the present invention, an administrator may be provided to facilitate and monitor the investment activities of each donation. The administrator may assist in establishing accounts, provide donees with access to and information about assets in the accounts, facilitate investment guideline development, and provide access to program agreement alternatives. The administrator may also aggregate brokerage or investment management data and provide reports to donees or donors on aggregated account activity, individual donor activity, values, or information about advisory fees and may monitor investment guideline and other program agreement compliance. Additionally, the administrator may provide periodic reports to donors or donees indicating the status of investments. The administrator may provide risk analytics and portfolio analysis on investment accounts at the request of the donee or donor. The administrator, donors, and nonprofits may communicate via a network, for example, to facilitate the donors' management over investments following donation as well as the nonprofits' tracking of donations and investments. Alternatively, the apparatus might be used by the donee for in house administration.

Additional aspects related to the invention will be set forth in part in the description which follows, and in part will be obvious from the description, or may be learned by practice of the invention. Aspects of the invention may be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification, exemplify certain aspects of the present invention and, together with the description, serve to explain some of the principles associated with the invention. In the drawings:

FIG. 6 illustrates a exemplary report consistent with certain embodiments of the present invention;

FIG. 7 illustrates another exemplary report consistent with certain embodiments of the present invention;

DETAILED DESCRIPTION

In the following detailed description reference will be made to the accompanying drawings, in which like numerals represent like elements throughout the figures. The accompanying figures illustrate exemplary embodiments consistent with the present invention, which are described in sufficient detail to enable those skilled in the art to practice the invention. It is to be understood that other implementations may be utilized and that structural and method changes may be made without departing from the scope of present invention. The following discussion is, therefore, not to be construed in a limiting sense.

Systems and methods consistent with the present invention enable a donor to donate an asset to a non-profit organization (NPO). The asset may be placed into an account owned by the NPO and the donor may retain the right to direct investment of the asset. Directing the investment may include, for example, choosing an investment vehicle, such as a stock or bond, or designating a secondary recipient for part or all of the proceeds of the asset.

Figure 1:
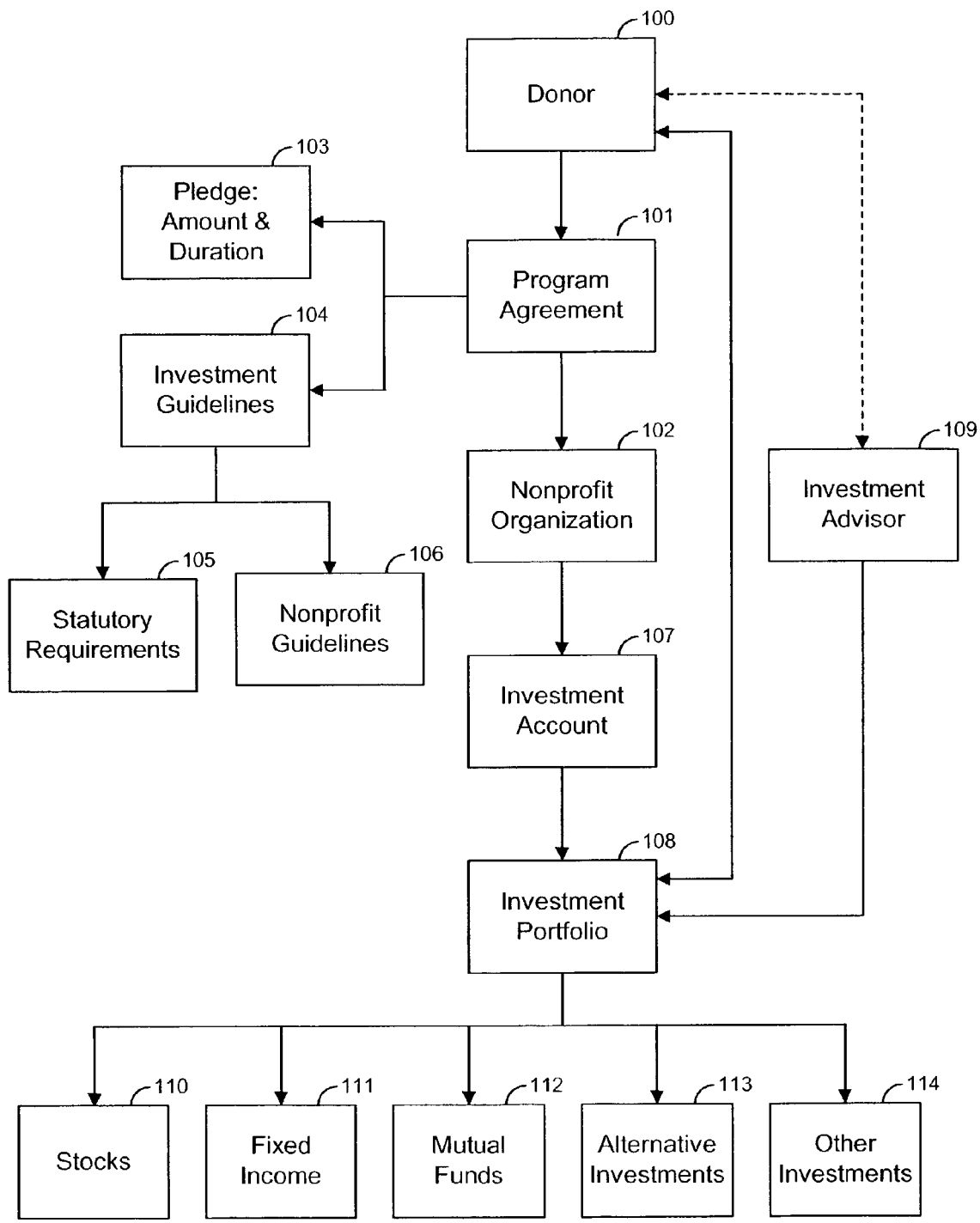
FIG. 1 is a flow diagram illustrating principles and aspects consistent with the present invention.

Consistent with exemplary embodiments of the present invention, methods may be provided for enabling donor-directed asset management. One embodiment of the present invention is illustrated, by way of example, in the flow diagram of FIG. 1. As illustrated in FIG. 1, a donor 100 may execute a program agreement 101 with a donee (e.g., NPO 102). Program agreement 101 may include a pledge 103 with, for example, a dollar amount of a donation as well as the duration of the program agreement. For example, if an NPO were planning to build a new facility in five years, the donor may pledge an amount of money with a five-year term during which the donor will direct investment of the initial money to grow the donation. The nonprofit may then name a wing of the building dedicated to the donor from the funds that have accumulated in the donor-directed investment portfolio over the previous five years. Program agreement 101 may also set forth investment guidelines 104 that the donor 100 and NPO 102 agree to follow. Investment guidelines 104 may include statutory requirements 105 that help ensure compliance with applicable tax laws (e.g., any requirements in an IRS Private Letter Ruling) and/or nonprofit guidelines 106 (e.g., "top off" requirements, limits on dollar amounts invested in stocks or bonds, risk management procedures, etc.). An exemplary program agreement 101 is attached in an Appendix.

When donor 100 makes an initial donation, NPO 102 may permit a donor to make such donation in a brokerage or investment management account 107 owned by NPO 102. Donor 100 retains the power to direct the investment of the donation in an investment portfolio 108. Portfolio 108 may be invested in any number of asset classes, such as stocks 110, fixed income securities 111, mutual funds 112, alternative investments 113, and/or other investments 114, subject to investment guidelines 104 and/or statutory requirements 105. Although donor 100 may manage investment decisions, in certain embodiments, donor 100 may not withdraw any funds from investment portfolio 108.

In one embodiment, donor 100 may designate a surviving family member or beneficiary to direct investment of portfolio 108 upon the donor's death. In this way, the donor-managed investment account may leverage the inter-generational giving favored by many NPOs. Similarly, donor 100 may involve family members in the investment decision process, for example, to encourage children to learn about investing and philanthropy.

Donor 100 may seek the advice of an investment advisor 109 to assist in the management of investment portfolio 108. Depending on the directions given to investment advisor 109 by donor 100, investment advisor 109 may have the authority to manage investment portfolio 108 subject to investment guidelines 104 and/or statutory requirements 105. At the end of the term set forth in pledge 103, donor 100's management over investment portfolio 108 may cease, and NPO 102 may receive the proceeds, including the initial donation and any gains from donor 100's direction of investment portfolio 108. This type of flexibility enables the donor, or wealth holder, to remain at the center of the decision-making process both before and after the donation is transferred to the recipient.

In one embodiment, donor 100 may assume the power to direct investment of the donation once it is received by NPO 102 via a donor-advised fund or community trust, for example. Although the donor may not control investment of the asset under the donor-advised fund or community trust, the donor and the NPO may agree upon investment guidelines that take effect once the asset is received by the NPO.

The foregoing discussion is intended to introduce and provide initial clarity for some of the aspects associated with the present invention by referring to the exemplary embodiment depicted in FIG. 1. Further details of the illustrated embodiment as well as additional aspects and embodiments of the present invention will be described in the following discussion.

Figure 2:
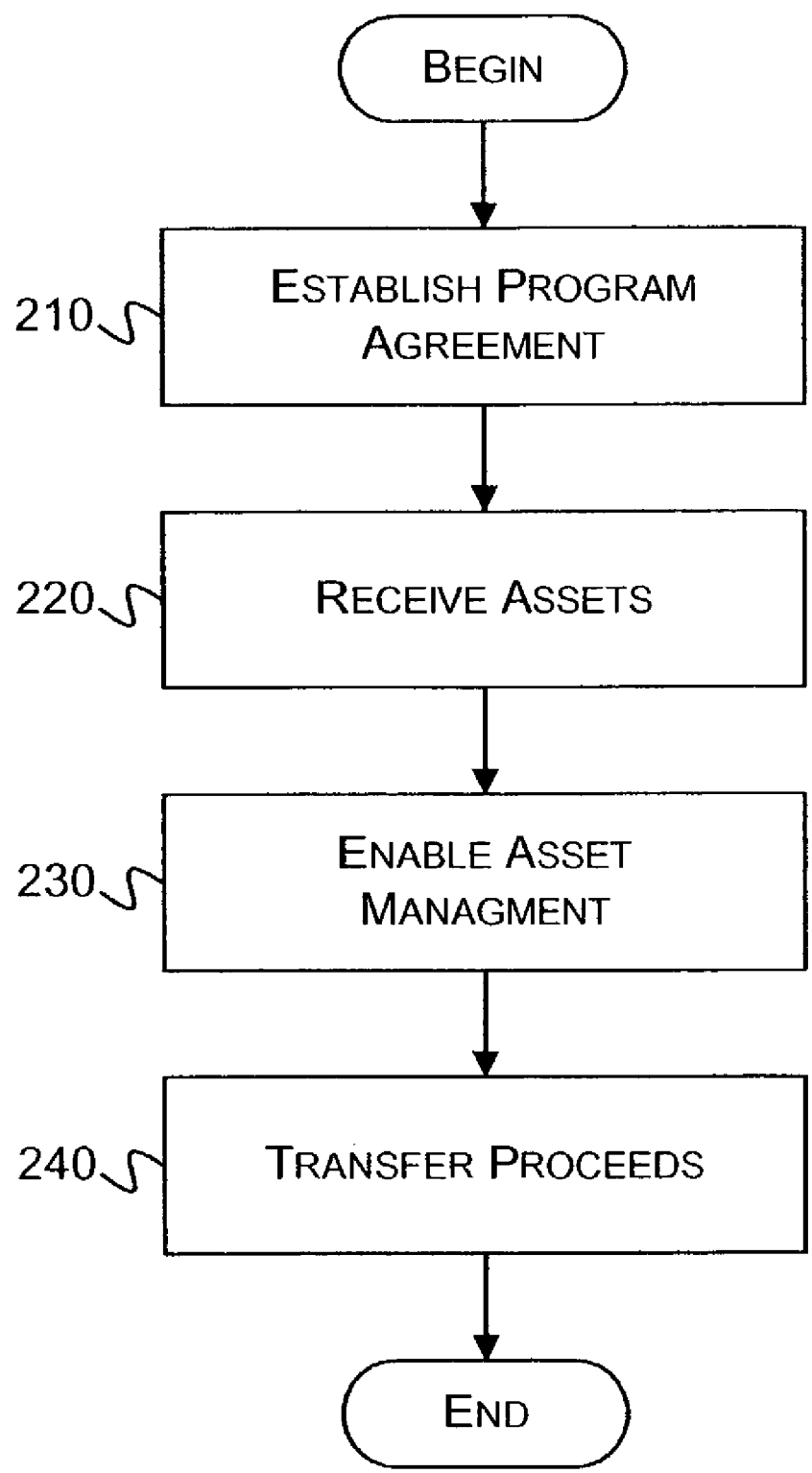
FIG. 2 is a flowchart consistent with methods of the present invention.

FIG. 2 is a flowchart consistent with methods of the present invention. As shown in FIG. 2, after a program agreement is established (stage 210), a donee may receive assets (stage 220) and enable asset management by the donor (stage 230). Proceeds may then be transferred to the donee (stage 240).

As illustrated by stage 210 of FIG. 2, methods of the present invention may be provided for establishing a program agreement between a donor and a donee. As used herein, the term "donor" refers to any individual, entity, or body that grants, gives, and/or contributes an asset to a donee. A "donee" is any entity or organization that is a recipient of an asset. Donees may include pubic and/or private organizations including, but not limited to, corporations, educational institutions, government agencies, foundations, medical institutions, research and development institutions/facilities, trade associations, social clubs, fraternal organizations, political groups, laboratories, partnerships, firms, enterprises, and/or service providers. In one embodiment of the present invention, a donee may be a Non-Profit Organization ("NPO"). An "NPO" may include any organization motivated by an interest other than profit. NPOs may include organizations from which shareholders or trustees do not benefit financially and to which donors may make tax-deductible contributions. NPOs may be organizations organized pursuant to nonprofit laws of a government or state and may have tax-exempt status under the Internal Revenue Code. NPOs may also be private organizations implementing public charity initiatives. NPOs may be organized pursuant to common interests of members, individuals, and/or institutions. For example, NPOs may pursue educational, charitable, and/or political purposes. As used herein, the term "asset" refers to any possession having commercial and/or exchange value. Assets might include, but are not limited to, currency, real property, intangible property, accounts receivable, and shares, options and/or futures on stocks, bonds, commodities, and/or indices or alternative investments.

A "program agreement" may be any agreement defining one or more obligations of one or more donors and donees. A program agreement may be tailored to the needs and desires of a specific donor and/or donee. A program agreement may include a contractual pledge from one party to another and/or a limited power of attorney. Issues addressed in the program agreement may include, but are not limited to: (1) the revocability of a contribution, (2) the term of investment period, (3) the commitment to any future asset HENDERSON contributions, (4) the intended use of assets, (5) permitted investment options, (6) investment guidelines, (7) guarantees to "top off" the donated asset in the event of an investment loss, and (8) circumstances giving rise to forfeiture of management. The program agreement may also define rules of engagement, set boundaries for information exchange, and specify remedies for noncompliance with the program agreement or any portion included therein. In one embodiment of the invention, the program agreement may be stored in a repository accessible by the participating parties. Details of such a repository will be discussed below in connection with FIG. 4.

Consistent with principles of the present invention, investment guidelines may include (1) donation limitations; (2) limitations on duration of donor management; (3) regulations regarding pooling donations with those of other donors, donees or other third parties; (4) limitation that no investment may be made in companies for which the donor has over a certain amount (e.g., one percent) of the outstanding shares of said stock; (5) agreements that, should the value of the investments in the brokerage or investment management account fall to less than some value (e.g., 65 percent) of the original value as of the date the nonprofit "cashes in" and donor management ceases, then the donor agrees on a best efforts basis to make an additional contribution to "top off" the difference; (6) termination of the program agreement if the donee's board of directors find that funds in the account are being invested improperly; (7) prohibition of the assets in the account from being pledged or encumbered by the donor in any manner; (8) prohibition of the donor from voting any stock or other securities that may be held in a donee-owned brokerage or investment management account; (9) giving the donee the right to withdraw any of the income and, if needed, the principal if the donee's board of directors finds that such withdrawal is warranted; (10) prevention of any interest in the donated property to be defeated by the performance, (11) consequences for failing to perform any part of the agreement, (12) prohibitions against self-dealing or quid pro quo benefits in return for contributions, or (13) absolute termination rights of the NPO in its sole discretion. Guidance from the IRS, such as a Private Letter Ruling, and/or in a legal opinion of counsel, can help ensure that such a donation arrangement complies with applicable tax laws to provide tax efficiency to donors.

Establishing a program agreement between a donor and donee may, in certain embodiments, facilitate tax efficiency. Tax efficiency may be provided through a tax-compliant program agreement that irrevocably makes the gift to the nonprofit while the donor retains investment management. Tax efficiency may allow a donation to grow tax-free as soon as it is donated, which would not be true if the donor tried to grow the money before donation in a traditional investment account that would be subject to taxation. With tax efficiency, the donor may be willing to donate earlier to prevent ordinary tax on a pre-planned giving investment, subject to the right to continue to manage the investment. For example, one million dollars invested at 10 percent will grow to $2,593,742 in a tax-free vehicle, whereas it will only grow to $1,790,848 if the annual gain is subject to a 40 percent tax rate. Although there are ways for an investor to mitigate the annual tax burden, funds invested in a tax-free vehicle will accumulate faster than those invested in a taxable environment.

Methods of the present invention may include receiving, by a donee, one or more assets from a donor, as indicated in stage 220 of FIG. 2. In one configuration, donors may electronically transfer assets to a particular donee. In certain embodiments, assets may be transferred by establishing one or more brokerage or investment management accounts and portfolios. A brokerage or investment management "account" may be any vehicle through which a donor can transfer an asset to a donee for investment and/or obtain the status of investments. Brokerage or investment management accounts may be on-line accounts owned and/or maintained by donees. In one embodiment of the present invention, a donor may establish an account through a donee portal. A "portal" may include any gateway through which a donor can identify, access, and acquire information associated with a donee. In one embodiment, portals could be maintained by a donee and implemented via one or more websites. A portal may provide features including, but not limited to, data access and searching, categorization, personalization options, data profiling, and marketing. In certain embodiments, a donor may initiate a request to open an account through a donor portal, but an administrator may establish and maintain the account. Details of such an administrator will be discussed below in connection with FIG. 4.

As used herein, the term "portfolio" refers to collection of assets invested by a donor. Consistent with principles of the present invention, a portfolio may serve as a vehicle through which a donor can view and retain control over invested assets. A "portfolio" may be invested in any number of asset classes including, but not limited to, stocks, fixed income securities, mutual funds, corporate bonds, money market accounts, real estate, commercial paper, CDs, IRAs, and alternative investments. In one embodiment, each investment may be associated with a single portfolio and/or donee. Thus, a donor could have a plurality of portfolios, each associated with a distinct investment and/or donee. Additionally or alternatively, a single portfolio for a particular donor could include contributions made to several distinct donees. Portfolios may be established and maintained by donees and/or by an administrator.

Consistent with principles of the present invention, methods may be provided for enabling donor-directed asset management (stage 230 of FIG. 2). A donor may manage and allocate asset investment after contributing assets to a donee. In one embodiment, this may include providing donors and donees with on-line access to accounts and portfolios. Accordingly, stage 230 may include establishing an underlying infrastructure for facilitating information exchange between donors and donees. For example, a communications network may be established or leveraged. Details of such a network will be explained below in connection with FIG. 6.

In one embodiment of the invention, donors may be presented (e.g., via a donee portal) with available investment options from which to choose. For example, a donor may select from several investment alternatives (e.g., stocks, bonds, indices, mutual funds, commercial paper, CDs, IRAs, real estate, etc.) to grow contributions. Donors may be allowed to view a portfolio and provide one or more instructions (e.g., via a donee portal) to direct investment of particular assets in the portfolio. Enabling donor-directed asset management may also involve permitting a donor to seek the advice of an investment advisor to assist in the management of a portfolio. In one embodiment of the present invention, an investment advisor may be given the authority to access and manage a donor's portfolio.

Consistent with principles of the present invention, enabling donor-directed asset management may apply to both new and past donations. That is, a donor or its investment advisor may manage newly donated assets and (with the permission of a donee) assets previously donated to and managed by the donee (i.e., "claw back" assets).

Enabling donor-directed asset management may also include monitoring donor and donee transactions and investment activities to help ensure compliance with program agreements, tax laws, investment guidelines, and other established regulations. Additionally, stage 230 may include generating accounting reports, market updates, real-time data, trend analysis reports, and other notifications to donors and donees.

In one embodiment, donor-directed asset management may be facilitated via an administrator. Such an administrator may be implemented by one or more application software modules. Additional details and functions of an administration module will be discussed below in connection with FIG. 4.

As depicted in stage 240, methods of the present invention may be provided for transferring proceeds to donees. Consistent with principles of the invention, donors may be given control over asset investment for a predetermined amount of time, which may be set forth in the program agreement. Accordingly, upon expiration of such a term, donor investment control may be ceased, and the proceeds of the investment of the asset may be transferred to the designated donee. In one implementation, the administrative interface mentioned above may prohibit donor transaction after expiration of the predetermined term. Donors may be notified of the term expiration, and control over assets may be automatically relinquished to donees.

Figure 3:
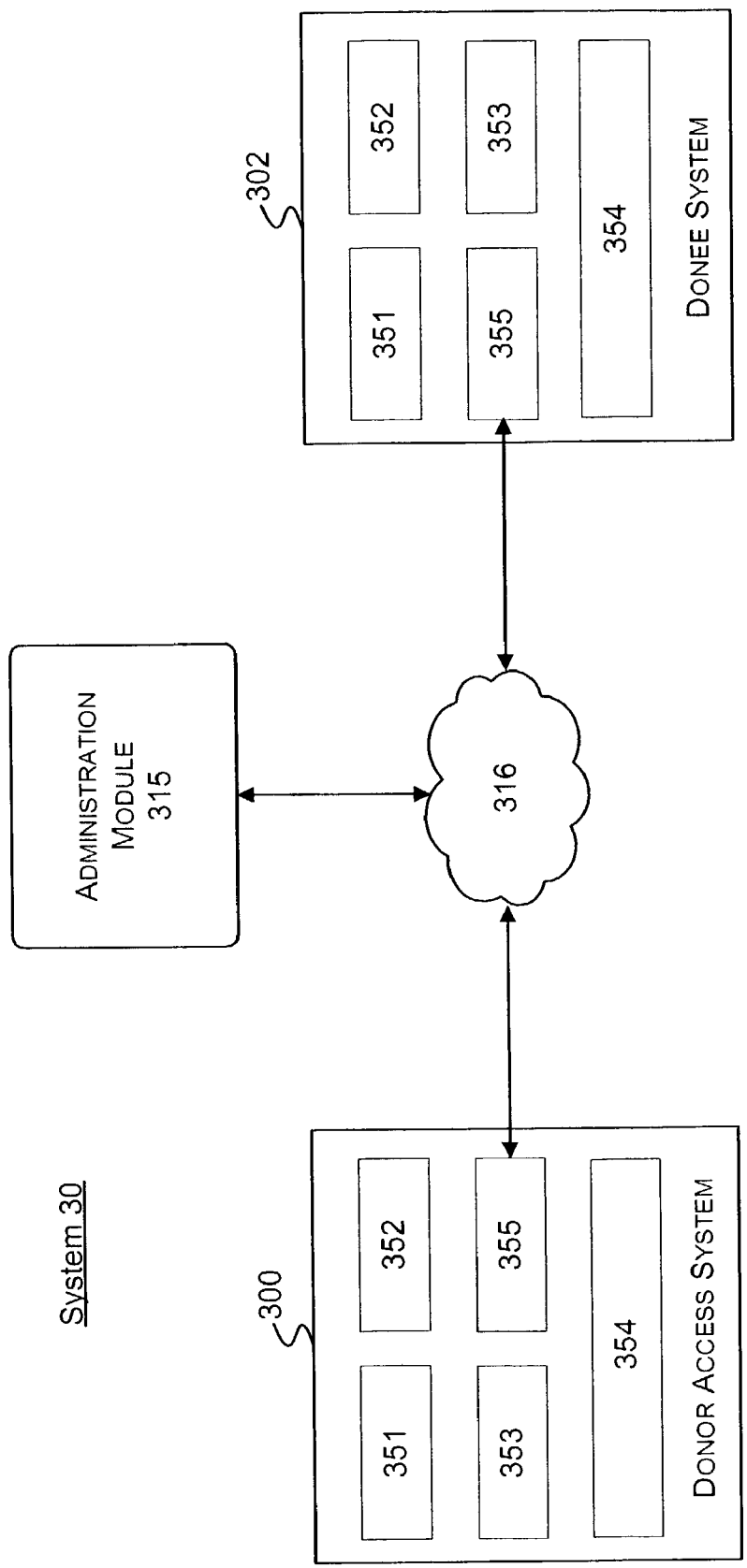
FIG. 3 is an exemplary block diagram of a system consistent with certain embodiments of the present invention.

FIG. 3 illustrates an exemplary system 30 in which methods, features, and principles consistent with the present invention may be implemented. In one embodiment consistent with the invention, system 30 may include a donor access system 300, a donee system 302, an administration module 315, and a network 316.

Donor access system 300 may be any device, system, or module configured to provide one or more donors with access to network 316. One particular combination of components that could reside in donor access system 300 includes a display device 351, an input device 352, a processor 353, a memory 354, and a network interface 355. Non-limiting examples of donor access system 300 include a laptop computer, desktop computer, server, workstation, mainframe, mobile computing device (e.g., a PDA), mobile communications device (e.g., a cell phone), or any other structure that enables a user to remotely access information. Donor access system 300 could even be a kiosk or "dumb" terminal connected to a server, workstation, mainframe coupled to network 316.

In one embodiment of the present invention, donor access system 300 may include display device 351, which may be any type of output device configured to output data (e.g., text, images, code, or any other type of information). For example, display device 351 may include a cathode ray tube, liquid crystal display, light-emitting diode display, gas plasma display, or other type of display mechanism. Display device 351 may be used in conjunction with input device 352 to enable a user operating donor access system 300 to interact with one or more processes executed by access system 300.

Input device 352 may be any type of input mechanism used to provide data to donor access system 300, such as a keyboard, a mouse, and/or a touch screen. Input device 352 may additionally or alternatively include a data reading device and/or an input port.

Processor 353 may be one or more devices operatively configured to execute program instructions. Processor 353 may be configured for routing information among components and devices and for retrieving and executing computer instructions, code, etc. stored in memory 354.

Memory 354 may be any mechanism capable of storing information including, but not limited to, RAM, ROM, magnetic and optical storage, organic storage, audio disks, and video disks. Although a single memory device 354 is shown, any number of memory devices may be included in donor access system 300, each configured for performing distinct functions associated with the system.

As FIG. 3 illustrates, donor access system 300 may be connected to network 316 via network interface 355, which may be operatively connected via a wired and/or wireless communications link. Network interface 355 may be any mechanism for sending information to and receiving information from network 316, such as a network card and an Ethernet port, or to any other network such as an attached Ethernet LAN, serial line, etc. Network interface 355 may be configured for translating data received from network 316 and formatting outgoing data. For example, network interface 355 may include or be coupled to an ATM Adaptation Layer (AAL) circuit.

Network 316 may be the Internet, a virtual private network, a broadband digital network, a local area network (LAN), a wide area network (WAN), a dedicated intranet, or any other structure for enabling communication between two or more remote locations. Network 316 may include one or more wired and/or wireless based connections. Network 316 may also employ communication protocols such as HyperText Transfer Protocol (HTTP), Transmission Control and Internet Protocol (TCP/IP), Asynchronous Transfer Mode (ATM), Ethernet, or any other compilation of procedures for controlling communications among network locations. Donor access system 300 may be operatively connected to network 316 by one or more communication devices and software, such as those commonly employed by Internet Service Providers (ISPs) or as part of an Internet gateway. Systems and devices coupled to and included in network 316 may be assigned network identifiers (ID), which may, in one configuration, be encoded as IP addresses. As used herein, the term "ID" refers to any symbol, value, tag, or identifier used for addressing, identifying, relating, or referencing a particular network device.

As illustrated in FIG. 3, donee system 302 may be coupled to network 316. Donee system 302 may be any device, system, or module configured to maintain donee information and provide one or more donees with access to network 316. As FIG. 3 depicts, donee system 302 may include components similar to those described in connection with donor access system 300. However, donee system 302 may have varying, additional, or fewer components than those described in connection with donor access system 300. For example, donee system 302 may include one or more data processing systems distributed throughout an organization. Moreover, donee system 302 may be a server that maintains and/or hosts via a memory 354 one or more websites and/or portals, which may each include a combination of intranet, extranet, and Internet websites with which donors can interact. One skilled in the art will appreciate that system 30 may include only administration module 315 and donor access system 300, consistent with an embodiment of the present invention. Alternatively, an embodiment of system 30 may include only administration module 315 and donee system 302.

In one embodiment of the present invention, administration module 315 may be coupled to network 316 and may serve as an administrative interface for donor access system 300 and donee system 302. Administration module 315 may be any device, system, mechanism, and/or compilation of processes for facilitating, tracking, and managing donor and donee activities. For clarity of explanation, administration module 315 is depicted external to donor access system 300 and donee system 302. However, administration module 315 may be included or distributed among systems 300 and 302. In one embodiment, administration module 315 may be implemented via application software residing in or distributed among one or more dedicated data processing systems having similar components to those described in connection with access system 300.

Administration module 315 may include one or more modem cards for dial-in users, gateway cards for connections to local area networks, and connecting devices coupled to outgoing lines. In certain implementations, administration module 315 may include components similar to those described in connection with network interface 355. Administration module 315 may also include one or more logic-based processes and/or components to support access, management, and allocation of assets. For example, administration module 315 may include components for establishing, storing, managing, and/or providing access to investment accounts, portfolios, and program agreements, obtaining and providing access to real-time information (e.g., positions and balances), managing and monitoring transactions between donors and donees, facilitating and monitoring communication among and between donors and donees, generating reports and analysis of data, performing statistical analyses, performing marketing functions, securing data and communications, and ensuring party compliance with tax laws/regulations and/or pre-established limitations, agreements, contracts, and guidelines. Exemplary components of administration module 315 will be discussed below in connection with FIG. 4.

Although FIG. 3 depicts a single donor access system 300, a single donee system 302, and a single administration module 315, system 30 may include any number of FINNEGAN geographically dispersed donor access systems 300, donee systems 302, and/or administration modules 315. Administration module 315 could therefore be configured to interact with several donors and donees simultaneously and individually. In addition, it should be understood that a single donor access system 300 may be configured to interact with a plurality of geographically dispersed donors. Further, a single donee system 302 may be configured to interact with a plurality of geographically dispersed donees.

For clarity of explanation, system 30 is described herein with reference to the discrete functional elements illustrated in FIG. 3. However, it should be understood that the functionality of these elements and modules may overlap and/or may exist in fewer elements and modules. For example, systems 300 and 302 may each lack certain illustrated components and/or contain, or be coupled to, additional components not shown. Moreover, all or part of the functionality of the elements illustrated in FIG. 3 may co-exist or be distributed among several geographically dispersed locations. Further, system 30 may include additional or fewer modules than those depicted in FIG. 3.

Figure 4:
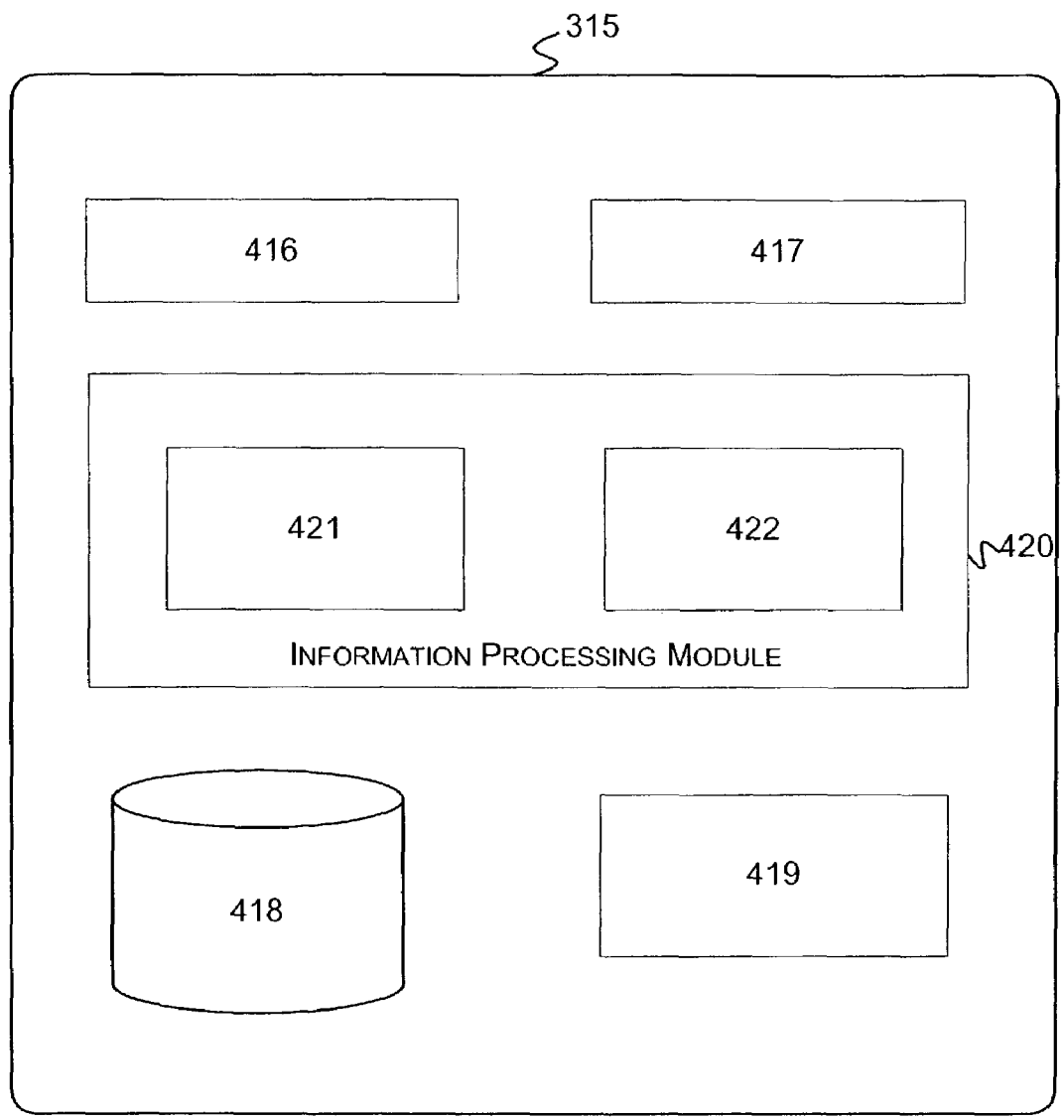
FIG. 4 shows an administration module consistent with certain embodiments of the present invention.

Referring now to FIG. 4, exemplary components of administration module 315 are described. As illustrated in FIG. 4, administration module 315 may include a donor interface 416, a donee interface 417, a storage device 418, a security module 419, and an information processing module 420.

Donor interface 416 may be one or more devices, modules, and/or mechanisms (e.g., hardware, software, or a combination thereof) for sending and receiving information to and from network 316, as well as donor access system 300. In one implementation, donor interface 416 may be a graphical user interface (GUI) that a donor can access via network 316 using a browser application residing on or coupled to donor access system 300. Donee interface 417 may be one or more devices, modules, and/or mechanisms configured to send and receive information to and from network 316, as well as donee system 302. For example, donee interface 417 may be a GUI accessible by a donee via network 316 and a browser application.

In one embodiment, either or both of interfaces 416 and 417 may include one or more network cards and Ethernet ports to facilitate communications with other devices or mechanisms connected to network 316 or another network, such as an attached Ethernet LAN, serial line, etc (not shown). In exemplary configurations, either or both of interfaces 416 and 417 may include one or more network interfaces which could be operatively connected via wired and/or wireless communications links. Interfaces 416 and 417 may each additionally include one or more data ports for transmitting data in various modes of transmission, such as serial transmission and parallel transmission.

In exemplary embodiments of the instant invention, the eXtendable Markup Language (XML) may be employed to facilitate the data exchange between administration module 315 and other entities to which it is coupled (e.g., system 300, system 302, and network 316). Additionally, or alternatively, the Standard Generalized Markup Language (SGML) and/or any other language that facilitates the creating and sharing of common information formats may be employed.

Storage device 418 may be any memory mechanism or module configured to store, maintain, and provide access to data. For example, storage device 418 could be a database. As used herein, the term "database" refers to any type of memory that maintains and stores information such as a relational database, distributed database, and/or object-F oriented programming database. Storage device 418 may be configured to store program agreements, accounts, and portfolios. Although FIG. 4 depicts a single database residing in administration module 315, a plurality of databases may be implemented within, or extended to, administration module 315.

Security module 419 may include one or more devices, mechanisms, and/or software processes configured to protect resources and information coupled to and/or interacting with administration module 315. Security module 419 may be configured to perform various functions such as data encryption and decryption and/or user authentication. Thus, security module 419 may include, or be coupled to, a public key infrastructure (PKI) employing public key cryptography. In exemplary embodiments, security module 419 may be configured to establish a secure layer between one or more resources associated with donors and donees and an outside network. Security module 419 may also be configured to establish and maintain one or more firewalls to protect donor and donee resources and proprietary information. Additionally, security module 419 may include or be coupled to one or more proxy servers that initiate network requests and processes on behalf of one or more users.

Information processing module 420 may include one or more devices, mechanisms, and/or processes for performing administrative tasks. For example, information processing module 420 may include one or more components and/or processes, implemented in software (e.g., Java) and/or hardware, for performing functions, such as providing access to real-time information, establishing accounts, facilitating and managing the exchange of information among and between one or more donors and donees, generating reports and analysis of data, statistical analyses, marketing functions, securing data, and ensuring party compliance with pre-established agreements and contracts. In one embodiment, information processing module 420 may include a compliance module 421, and a reporting module 422, as illustrated in FIG. 4.

Compliance module 421 be configured to monitor and help ensure that donors and donees are complying with laws, regulations, investment guidelines, and pre-established program agreements, which may be stored in storage device 418. Compliance module 421 may be configured to interact with storage device 418 and compare donor and/or donee activities with provisions included in the program agreement. Compliance module 421 may also be configured to block activities it deems to violate a program agreement or any other laws, regulations, and/or guidelines contained in storage device 419.

Reporting module 422 may include one or more components and processes, implemented in software (e.g., Java) and/or hardware, for capturing, processing, and/or reporting information. In certain embodiments, reporting module 422 may be configured to capture errors, capture transaction data, manage SQL (Structured Query Language) queries, and generate reports and/or direct reports generated from other systems coupled to network 316. Reporting module 422 may, in certain implementations, generate reports for donors, donees, and/or other modules within administrator 315 by accessing data stored in database 418. Administrator 315 may send reports to donors via donor interface 416 and may send reports to donees via donee interface 417. Alternatively, donors and/or donees may download reports via donor interface 416 and/or donee interface 417, respectively. In another embodiment, reports may be viewed by donor and/or donees using, for example, a browser.

Figure 5:
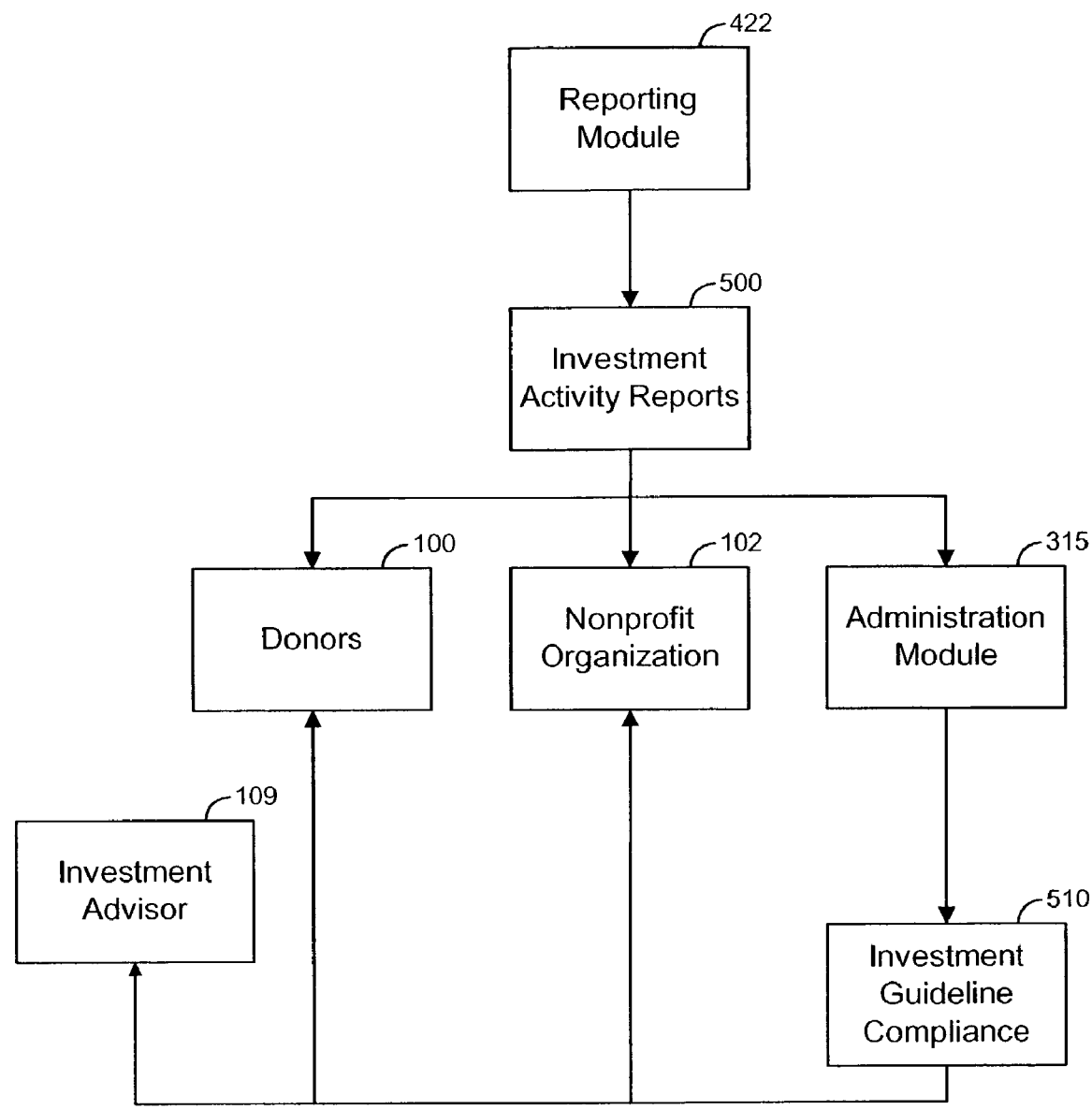
FIG. 5 diagrammatically depicts aspects of reporting consistent with certain embodiments of the present invention.

FIG. 5 diagrammatically depicts further aspects of reporting consistent with the present invention. As illustrated, reporting module 422 may generate periodic investment activity reports 500 for each investment portfolio (e.g., investment portfolio 108) maintained and/or managed by administration module 315. Investment activity reports 500 may indicate, for example, a current status and past performance of the portfolio. Donors (e.g., donor 100) may receive investment activity reports 500, for example, electronically through network 316 and/or in hard copy form (e.g., via mail). A donee (e.g., NPO 102) may receive, for example, investment activity reports 500 or summary reports on all of the donors associated with the organization. Other reports provided to the donor and/or donee may include information related to combined account activity, donor activity, advisory fees (e.g., those charged by an administrator), tax information, regulatory information, risk analysis, portfolio analysis, and investment performance.

FIG. 6 depicts a sample investment activity report 600 consistent with certain embodiments of the present invention. Investment activity report 600 may include a list of gifts, pledges, and a total of gifts and pledges. The investment activity report may also include information such as investment type, market value, and percent change for one or more portfolios corresponding to a donor. The investment activity report may list a plurality of portfolios separately or may list portfolio totals.

FIG. 7 is a sample summary report 700 consistent with certain embodiments of the present invention. Summary report 700 may list the donors associated with a particular donee along with the gifts and pledges made by each donor. The summary report may include market values, percent change, investment type, etc. for each donor's portfolios, individually or in total.

For clarity of explanation, interfaces 416 and 417, storage device 418, security module 419, and information processing module 420 are described herein as discrete functional elements. It should, however, be understood that the functionality of these modules may overlap and/or may exist in fewer or additional modules. Moreover, all or part of the functionality of the elements illustrated in administration module 315 may co-exist or be distributed among several geographically dispersed locations, including other systems and module within system 30. For example, all or part of security module 419 may be included in donee and/or donor access systems 416 and 417. Also, administration module 315 may include additional or fewer features than those described in connection with the illustrated modules. Further, one or more of the modules (or components therein) residing in administration module 315 may be scalable in order to accommodate additional services, data, customers and/or providers.

Figure 8A:
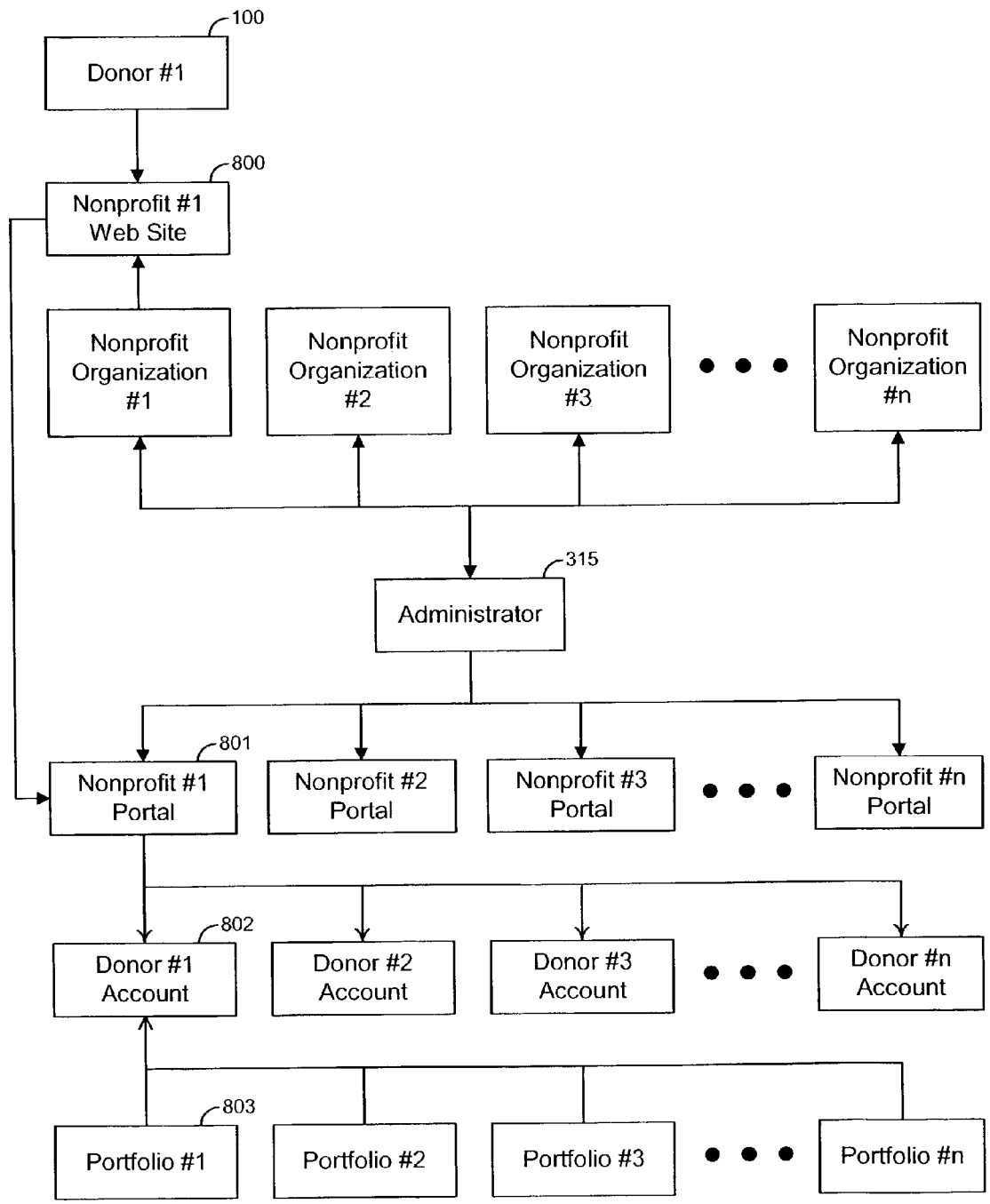
FIGS. 8A-8C are flow diagrams depicting exemplary interaction between the elements of a system consistent with certain embodiments of the present invention.
Figure 8B:
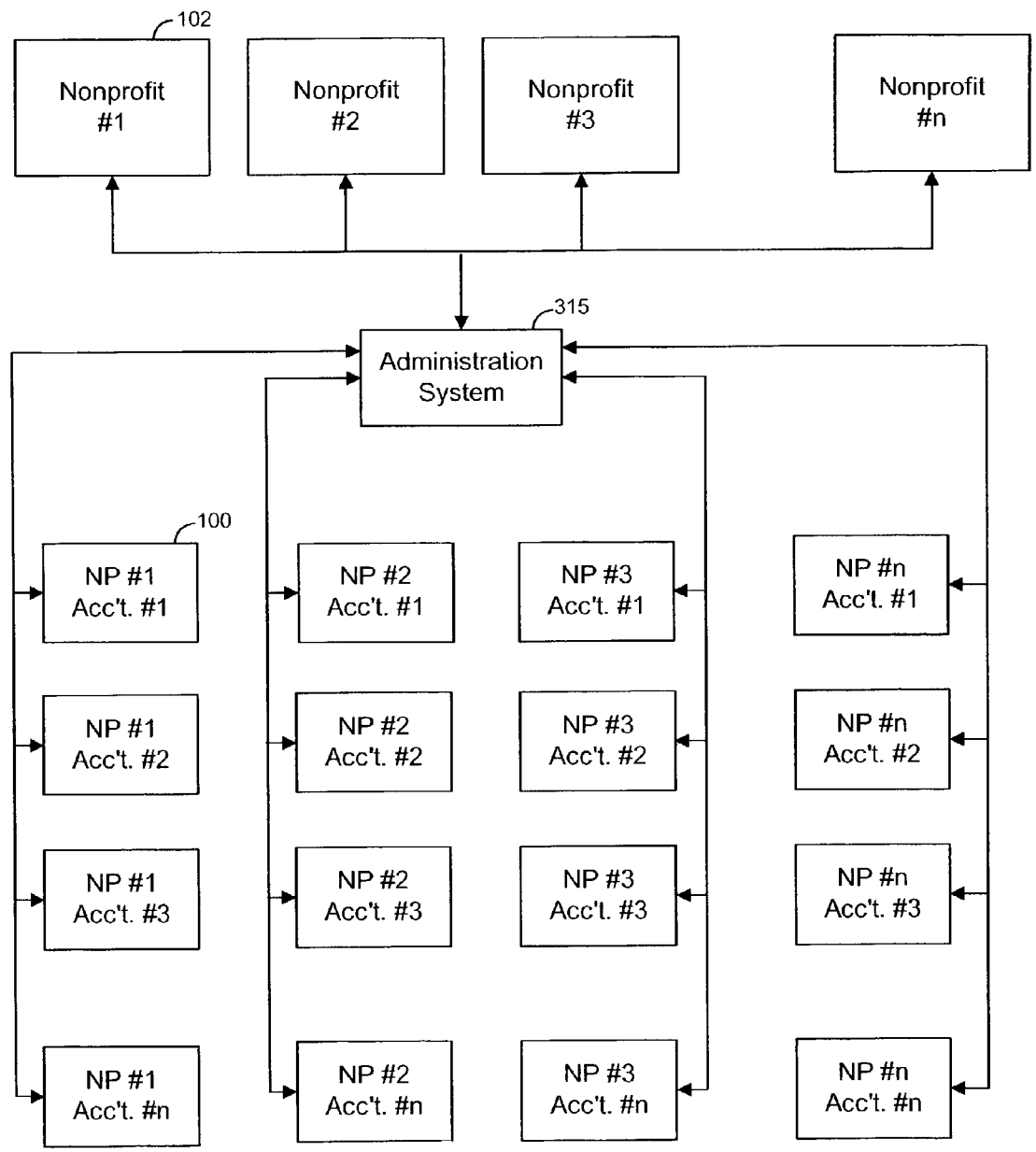
Figure 8C:
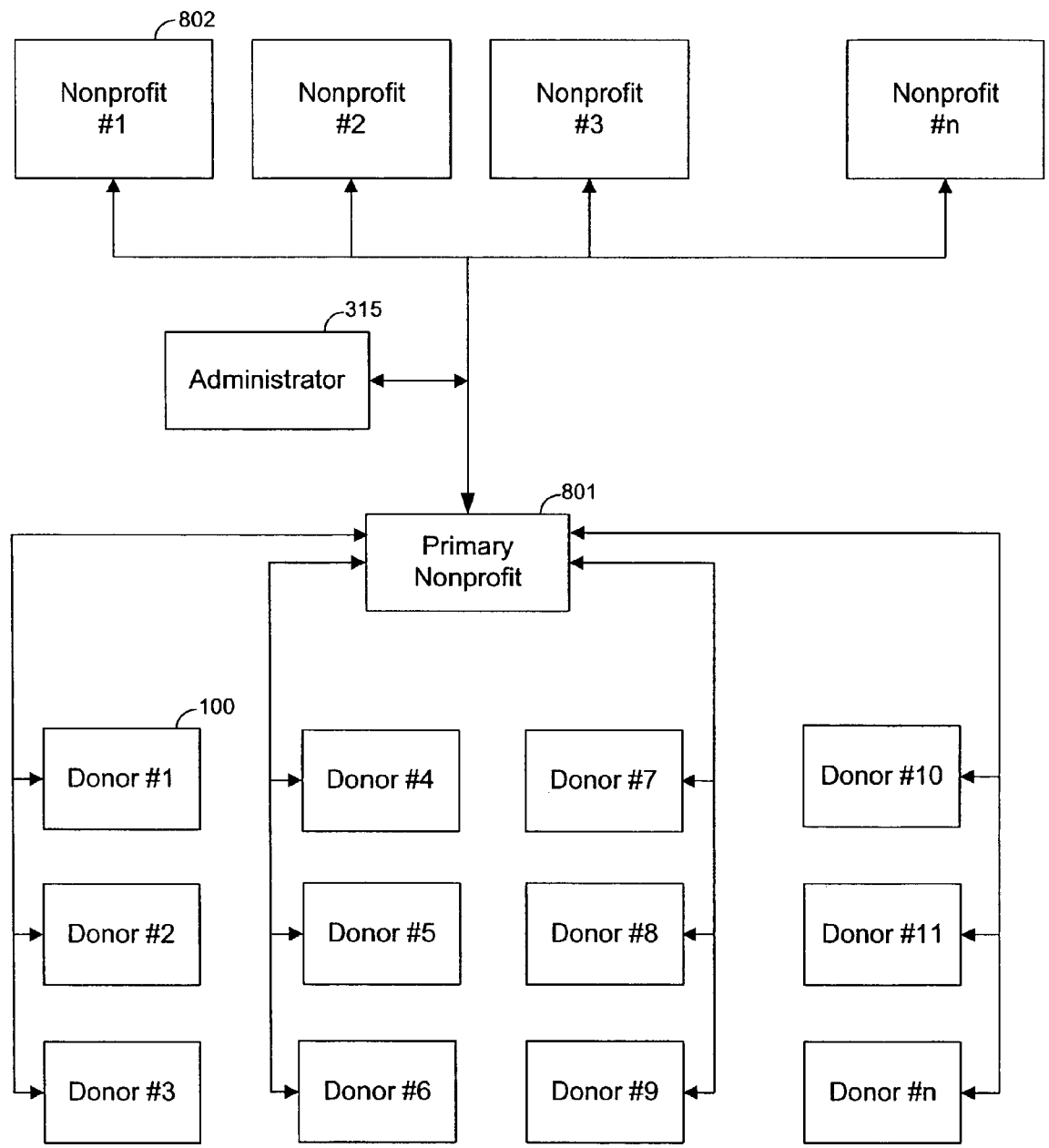

FIGS. 8A-8C illustrate exemplary interrelationships among the constituents of system 30. In the example shown in FIG. 8A, a donor (e.g., donor 100) may enter a donee web site 800 to link to a donee portal 801. Donor 100 may be prompted to enter a password to access nonprofit portal 801. Donee portal 801 may enable donor 100 to view one or more portfolios 803. Nonprofit organizations may also access a portal to review each donor's individual account (802) and/or obtain reports. Administration module 315 may interact with donors and/or donees to facilitate donor directed asset management.

In another example shown in FIG. 8B, a plurality of nonprofits 102 may interact with administration module 315. Each nonprofit may manage and view one or more accounts 100 through administration module 315. Administration module 315 may interact with donors and/or donees to facilitate donor directed asset management.

In an alternative embodiment shown in FIG. 8C, a donor may give an asset to a primary recipient 801 and receive a tax benefit at the time of donation. The donor and/or the primary recipient may invest the asset for a period of time, and the donor may later direct the primary recipient to make one or more disbursements of the asset and/or the investment proceeds to one or more secondary recipients 802. Alternatively, the primary recipient 801 may be permitted to choose the secondary recipient(s) 802, with or without advice from the donee. Consistent with the present invention, the donor could select the primary recipient as a default investment manager, or the donor could permit the primary recipient to arrange with a third party investment manager to direct the investment of the asset.

In this embodiment, the donor may receive tax benefits when the asset is initially donated while delaying a decision on the ultimate recipient of the asset and/or the investment proceeds. The provisions for this type of arrangement may be established, for example, using a program agreement as described above.

In other examples, a donor may make a plurality of donations to a plurality of donees. Administration module 315 may maintain a single portfolio for the donor which indicates all of the donee brokerage or investment management accounts. Accordingly, a donor could login to administration module 315 via interface 416 and view all accounts via a single portfolio. In addition, the donor could be linked to donee portals by selecting a particular donee account from the portfolio maintained by administration module 315.

Figure 9:
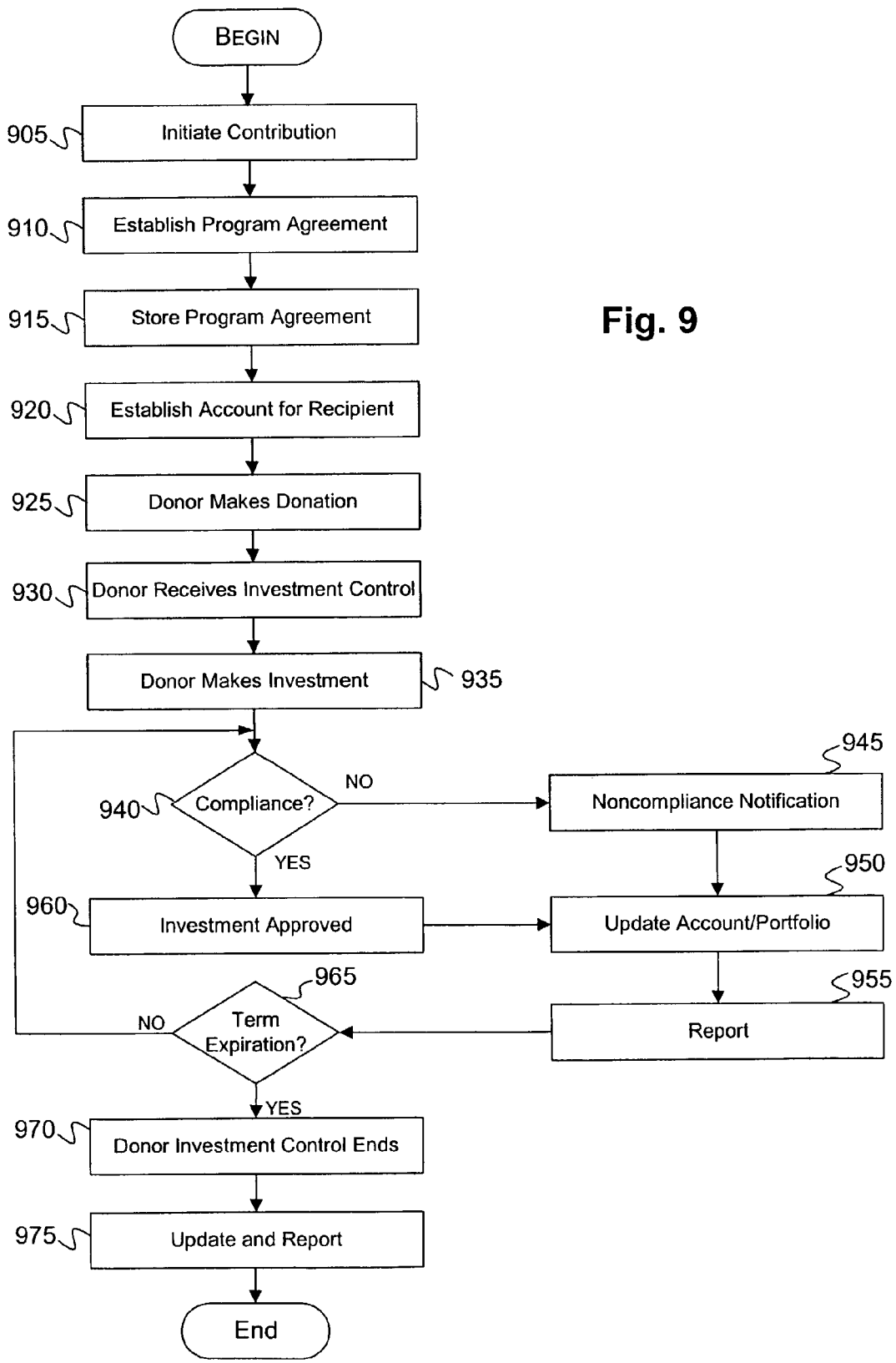
FIG. 9 is a flowchart depicting an embodiment of the present invention in accordance with certain implementations.

FIG. 9 is a flowchart depicting an embodiment consistent with the present invention. Operation of the exemplary embodiment may be consistent with the steps illustrated in the flowchart of FIG. 9. A donor and a donee may establish contact to initiate a contribution (stage 905). For example, a donor may visit (via donor access system 300) a website maintained by a particular donee (via donee system 302) and contact that donee via e-mail or phone. In other embodiments, a donee may initiate contact, via e-mail, phone, and/or regular mail, with a donor to solicit contributions. In one example, administration module 315 may be configured to perform marketing functions for a donee such as transmitting solicitations to donor access system 300 via network 316. Stage 905 could also involve a donor initiating contact with a prior donee.

Subsequently, a program agreement may be established between the donor and donee (stage 910). In one embodiment, the donor and donee may execute an agreement which sets forth, for example, the amount and type of asset the donor wishes to contribute to the donee, guidelines for the investment of that asset, and the term over which the donor can maintain investment control over the asset. This may also involve establishing an agreement by which the donor allows an investment advisor to control the investment of the contribution. In certain embodiments, one or more pre-established agreements could be used. However, the program agreement may be negotiated and tailored to the specific needs and desires of the donor and/or donee. The program agreement could be written and/or oral and may be executed, for example, in person, by telephone, via e-mail, and/or on-line via donor access system 300 and donee system 302. In certain embodiments, administration module 315 may facilitate the program agreement. For example, via access interfaces 416 and 417 respectively, the donor and donee may establish and execute the program agreement on-line. Additionally or alternatively, administration module 315 could monitor the execution of the program agreement. One example of a program agreement consistent with certain embodiments of the present invention is shown in FIGS. 10A-10I.

Once the program agreement is executed, the agreement may be stored (stage 915). The program agreement may, for example, be stored in storage device 418 of administration module 315. In one embodiment, donee system 302 may transmit the executed agreement, via network 316, to administration module 315. This may also include retrieving and storing investment guidelines and/or statutory requirements from other resources coupled to network 316.

Next, an account and/or portfolio may be established (stage 920). In one embodiment, the donee may provide the donor with an on-line brokerage or investment management account through which the donor can make the contribution. Such a brokerage or investment management account could be established and maintained by donee system 302 and/or administration module 315. Stage 920 may also include establishing a portfolio for the donor. For example, administration module 315 could generate and/or store a new on-line portfolio for the donor or add the contribution to a previously established portfolio for the donor. Alternatively, the portfolio could be established and/or maintained by donee system 302. Account establishment may additionally include retrieving personal and/or contact information about the donor and issuing, via security module 419, a user name, account number, and/or password to the donor for accessing information stored by administration module 315 and/or donee system 302 (e.g., accounts, portfolio, etc.). For example, the donor may provide the contact information, via donor access system 300, to administration module 315 over network 316.

Once an account is established, the donor may transfer the asset to the donee (stage 925). For example, the donor may, via donor access system 300 and administration module 315, electronically transfer funds over network 316 from a personal account to the donee-owned brokerage or investment management account. Such an electronic asset transfer may be secured via security module 419. The donor may retain control to invest the asset (stage 930).

Accessing a donation may involve obtaining real-time balances of investments via administration module 315. In one embodiment, a donor may visit a donee website and link to a donee portal via donor access system 300. The donor may be prompted by security module 419 to provide a username and/or password before access to the portal is granted. The donee portal may enable the donor to view an investment portfolio which indicates the status of contributed assets. In one embodiment, the portal may link the donor to administration module 315, through which account information can be accessed from storage device 419. However, in certain embodiments, a donor portfolio could include donations made by a donor to a plurality of donees and may be maintained by administration module 315. Accordingly, a donor may access administration module 315, view a portfolio via donor interface 416, and select and link from the portfolio to a particular donee portal, through which the donation may be accessed.

A donor or investment advisor may then invest all or a portion of the asset (stage 935). Donors may be presented with available investment options from which to choose via donor interface 416 and/or donee portals. Donors may also be presented, via administration module 315, with real-time quotes, prices, and analytic data associated with varying investment options. The investment may be received from the donor by donor access system 300 and routed, via network 316, to administration module 315. The investment could, in other embodiments, be received from donor access system 300 by donee system 302 (via a portal) and routed, via network 316, to administration module 315. In certain embodiments, the donor may invest the asset directly into the stock, bond, etc.

When an investment occurs, administration module 315 may determine, via compliance module 421, whether or not the investment complies with the program agreement, applicable tax laws, and/or investment guidelines (stage 940). If compliance module 421 determines that the request violates an established provision (stage 940=No), then a noncompliance notification may be generated detailing the invalid investment (stage 945), the account and/or portfolio may be updated to reflect the invalid investment (stage 950), and a report may be generated and transmitted by reporting module 422 to donor access system 300 and/or donee system 302 (stage 955).

If, however, compliance module determines that the investment complies with all agreements and provisions (stage 940=yes), then the investment will be approved (stage 960). In certain embodiments, this may involve administration module 315 transferring (or causing an outside source to transfer) assets to a particular investment vehicle. After the investment, the accounts and/or portfolios may be updated to reflect the transaction (stage 950) and a report may be generated and transmitted by reporting module 422 to donor access system 300, donee system 302 or administrator 315 (stage 955).

Each of stages 934-965 may be repeated any number of times before the term of control established in the program agreement expires (i.e., while stage 965=No). However, in certain embodiments, the number of requests could be limited by the program agreement. Upon expiration of the term of control set forth in the program agreement (i.e., stage 965=Yes), the donor may relinquish control over the contributed assets (stage 970). The accounts and portfolios may then be updated and reports may be transmitted to donor access system 300 and/or donee system 302 (stage 980). For example, a portfolio containing a plurality of donations to several donees may be updated to indicate that a particular donation is no longer accessible.

The stages illustrated in the flowchart of FIG. 9 show one exemplary implementation consistent with the instant invention. It should therefore be understood that other method steps may be used, and even with the method depicted in FIG. 9, the particular order of events may vary without departing from the scope of the present invention. Further, certain stages may not be present, additional stages may be added, and the order of the stages may be modified without departing from the scope and spirit of the invention, as claimed.

Embodiments of the disclosed system may be implemented in various environments. Further, the processes described herein are not inherently related to any particular apparatus and may be implemented by any suitable combination of components. Further, various types of general purpose devices may be used in accordance with the teachings described herein.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the invention disclosed herein. For example, a donor's donation may be held in a single account with many sub-accounts, with each of the sub-accounts owned by different NPOs. This would enable a donor to make and manage donations to several different NPOs using a single account.

In another example, an employer may offer donor-directed asset management accounts as a benefit to employees. In this embodiment, an employee may have an amount of money withheld from each paycheck to be donated to an NPO and the employer may provide an account enabling the employee to direct the investment of the money. The employer may provide additional "matching" funds to increase an employee's donation.

It is intended that the specification and examples be considered as exemplary only. To this end, it is to be understood that inventive aspects lie in less than all features of a single foregoing disclosed embodiment, implementation, or configuration. Thus, the true scope and spirit of the invention is indicated by the following claims.

What is claimed is:

1. A computer-implemented method for managing assets, comprising:
   providing a computer processor;
   receiving, by a donee, at least one asset from a donor for investment;
   establishing a program agreement between the donor and the donee that includes at least one investment guideline;
   enabling the donor, by utilizing the computer processor, to direct and control the investment of the asset after the asset has been received by the donee and ownership of the asset has been transferred to the donee;
   investing the asset in an investment vehicle according to the donor's direction after the ownership of the asset has been transferred to the donee; and
   enabling the donor to direct distribution of investment proceeds of the asset to the donee after the asset has been invested.

2. The computer-implemented method of claim 1, further comprising:
   monitoring the investment by an administrator to help ensure compliance with the at least one investment guideline.

3. The computer-implemented method of claim 2, further comprising:
   establishing, by the administrator, an account into which the at least one asset is deposited.

4. The computer-implemented method of claim 2, wherein enabling the donor to direct and control the investment of the asset after the asset has been received and ownership of the asset has been transferred includes:
   presenting, via the administrator, the donor with an investment option; and
   receiving, via the administrator, an instruction from the donor to invest the asset according to the investment option.

5. The computer-implemented method of claim 4, wherein presenting the donor with an investment option includes presenting a choice of investment vehicles including at least one of stocks, bonds, indices, mutual funds, commercial paper, CDs, IRAs, and real estate.

6. The computer-implemented method of claim 3, further comprising:
   establishing a plurality of sub-accounts within the account, wherein each sub-account is owned by a different donee.

7. The computer-implemented method of claim 1, wherein the donor is an individual, the donee is a nonprofit organization, and receiving at least one asset for investment includes receiving at least one irrevocable financial donation.

8. The computer-implemented method of claim 1, wherein establishing the program agreement includes establishing a contractual pledge from the donor to the donee.

9. The computer-implemented method of claim 1, wherein establishing the program agreement includes establishing a term of investment period.

10. The computer-implemented method of claim 9, wherein enabling the donor to direct and control the investment of the asset includes enabling the donor to direct and control the investment of the asset until the term of investment period expires.

11. The computer-implemented method of claim 1, further comprising:
   storing the program agreement by the administrator.

12. The computer-implemented method of claim 1, further comprising:
 enabling a beneficiary of the donor to direct and control the investment after the donor's death.

13. The computer-implemented method of claim 1, wherein the asset is received from the donor via at least one of: a donor-advised fund and a community trust.

14. In a system having a donor access system and an administration module, a computer-implemented method for facilitating asset management, comprising:
 providing a computer processor;
 establishing a program agreement between a donor and a donee that includes at least one investment guideline;
 storing the program agreement by the administration module;
 establishing, by the administration module, an account for receiving a non-cash asset from the donor to the donee, whereby upon receipt, ownership of the non-cash asset is transferred to the donee;
 providing the donor, by utilizing the computer processor, with access to the account via the donor access system to direct and control investment of the non-cash asset after ownership has been transferred to the donee;
 after ownership of the non-cash asset has been transferred to the donee, receiving, by the administration module, a request from the donor via the donor access system to invest the non-cash asset in an investment vehicle;
 determining, by the administration module, whether the request complies with the at least one investment guideline;
 performing the request, by the administration module, when the request complies with the at least one investment guideline; and
 enabling the donor via the donor access system to direct distribution of investment proceeds of the non-cash asset to the donee after the non-cash asset has been invested.

15. The computer-implemented method of claim 14, wherein the donor is an individual, the donee is a nonprofit organization, and establishing the program agreement includes establishing a contractual pledge from the individual to the nonprofit organization.

16. The computer-implemented method of claim 14, wherein establishing the program agreement includes establishing a term of investment period.

17. The computer-implemented method of claim 16, further comprising:
 determining whether the term of investment has expired; and
 prohibiting the donor from accessing the account after the term is determined to be expired.

18. The computer-implemented method of claim 14, wherein receiving a request from the donor access system to invest the non-cash asset in an investment vehicle includes receiving a request to invest the non-cash asset in at least one of: a stock, bond, index, mutual fund, commercial paper, CD, IRA, and real property.

19. A system for donor directed asset management, comprising:
 a computer processor;
 an administration module, coupled to a network, for storing a program agreement between a donor and a donee and for maintaining a portfolio associated with an asset transferred to the donee by the donor, wherein the transfer includes transfer of ownership of the asset to the donee; and
 a donee system, coupled to the network, for providing the donee with access to the asset,
 wherein the administration module enables the donor, via the computer processor, to direct and control investment of the asset after the asset is transferred to the donee and to direct distribution of investment proceeds of the asset to the donee after the asset has been invested.

20. The system of claim 19, further comprising:
 a donor access system, coupled to the network, for providing the donor with access to the portfolio.

21. The system of claim 20, wherein the donor access system includes at least one of a portable computing device, a desktop computer, a laptop computer, a workstation, and a portable communications device.

22. The system of claim 19, wherein the donor in an individual investor.

23. The system of claim 19, wherein the donee is a nonprofit organization.

24. The system of claim 19, wherein the storage device is a database.

25. The system of claim 19, wherein the program agreement is a contractual agreement between the donor and donee specifying at least one term by which the donor and donee must abide.

26. The system of claim 25, wherein the at least one term includes at least one of an investment time period, available investment options, and investment guidelines.

27. The system of claim 19, wherein the donee system includes a server.

28. The system of claim 19, wherein the administration module further comprises:
 a receiving component for receiving an instruction from the donor to invest the asset in an investment option;
 a determining component for determining whether the instruction complies with the program agreement; and
 an investing component for investing the asset in the investment option when the instruction complies with the program agreement.

29. The system of claim 28, wherein the administration module further comprises:
 a report component for generating and transmitting a report.

30. The system of claim 29, wherein the report includes information about at least one of: combined account activity, donor activity, advisory fees, tax information, regulatory information, risk analysis, portfolio analysis, and investment performance.

31. The system of claim 19, wherein the donee system further provides the donee with information about the asset.

32. The system of claim 19, wherein the administration module further facilitates development of the program agreement.

33. The method of claim 32, wherein the administration module further includes:
 a matching module for submitting a proposed investment guideline from the donee to the donor, receiving a response to the proposed investment guideline from the donor, and comparing the proposed investment guideline and the response.

34. The system of claim 19, wherein
 the administration module further combines information about multiple assets transferred to the donee; and
 the donee system further presents the combined information to the donee.

35. An apparatus for facilitating donor-directed asset management comprising:
 means for storing a program agreement between a donor and a donee and for maintaining an account associated with the donee means for receiving an instruction from the donor to invest an asset previously transferred by the donor into the account in an investment vehicle, wherein the donor has previously transferred ownership of the asset to the donee;

means for determining whether the instruction complies with the program agreement;

means for causing the asset to be invested in the investment vehicle when the instruction complies with the program agreement; and means for enabling a donor to direct distribution of investment proceeds of the asset to the donee after the asset has been invested.

36. The apparatus of claim 35, wherein the donee is a nonprofit organization.

37. The apparatus of claim 36, wherein the program agreement establishes a contractual pledge from the donor to the nonprofit organization.

38. The apparatus of claim 35, wherein the program agreement specifies a plurality of investment vehicles in which the asset may be invested.

39. The apparatus of claim 35, further comprising:
means for notifying the donor when the instruction does not comply with the program agreement.

40. The apparatus of claim 39, wherein the notifying means periodically generates reports reflecting the status of the asset.

41. A computer-readable hardware medium containing instructions for controlling a computer system coupled to a network to perform a method, the computer system having a processor for executing the instructions, the method comprising:

storing a program agreement between a donor and a donee;

maintaining a portfolio associated with an asset transferred to the donee by the donor, wherein the transfer includes transfer of ownership of the asset to the donee;

receiving, over the network, an instruction from the donor to invest the asset in an investment option;

determining whether the instruction complies with the program agreement;

causing the asset to be invested in the investment option when the instruction complies with the program agreement; and enabling a donor to direct distribution of investment proceeds of the asset to the donee after the asset has been invested.

42. A computer-implemented method for managing assets, comprising:

providing a computer processor;

receiving, by a primary recipient, at least one asset from a donor;

enabling the donor, by utilizing the computer processor, to direct and control investment of the asset after the asset is received by the primary recipient and ownership of the non-cash asset is transferred to the primary recipient;

investing the asset according to the donor's direction after the ownership of the asset is transferred to the primary recipient; and sending a disbursement based on the investment of the asset from the primary recipient to a secondary recipient.

43. The computer-implemented method of claim 42, wherein the secondary recipient is selected after the asset is received by the primary recipient.

44. The computer-implemented method of claim 43, wherein the donor selects the secondary recipient.

45. The computer-implemented method of claim 43, wherein the primary recipient selects the secondary recipient.

46. The computer-implemented method of claim 42, wherein the disbursement includes proceeds from the investment of the asset.

47. The computer-implemented method of claim 42, wherein the disbursement includes at least a portion of the asset.

* * * * *